Aug. 5, 1958

H. HIGER 2,846,155

REFUSE DISPOSAL APPARATUS

Filed April 1, 1954

INVENTOR.
HARRY HIGER

BY
Gregory S. Dolgorukov
ATTORNEY

Aug. 5, 1958
H. HIGER
2,846,155
REFUSE DISPOSAL APPARATUS
Filed April 1, 1954
4 Sheets-Sheet 2
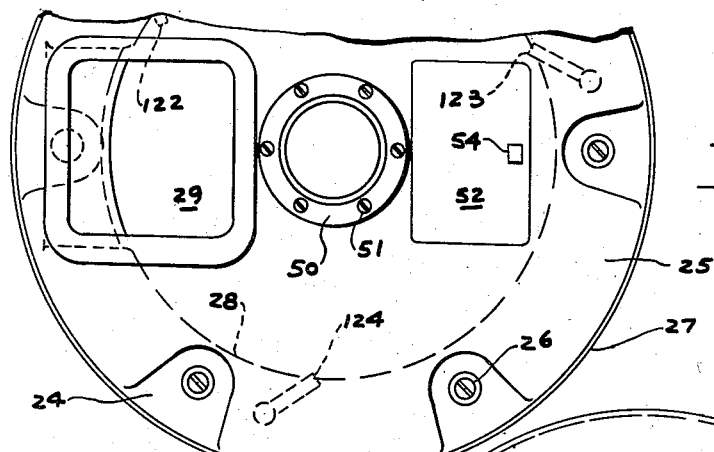
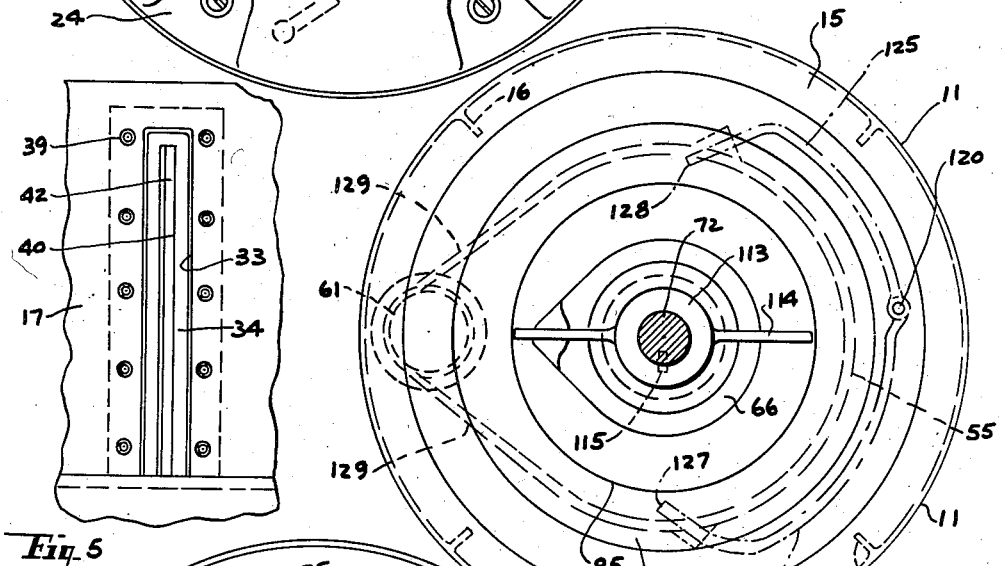
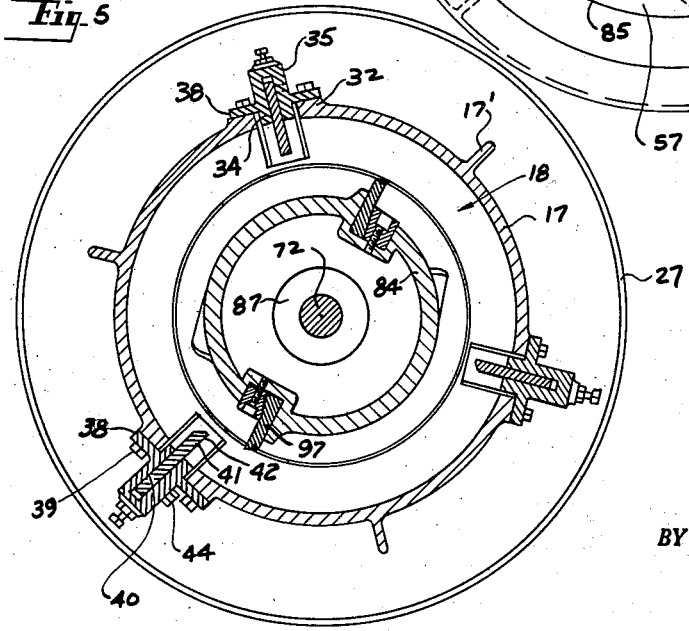
INVENTOR.
HARRY HIGER
BY
Robert A. Slomon
ATTORNEY

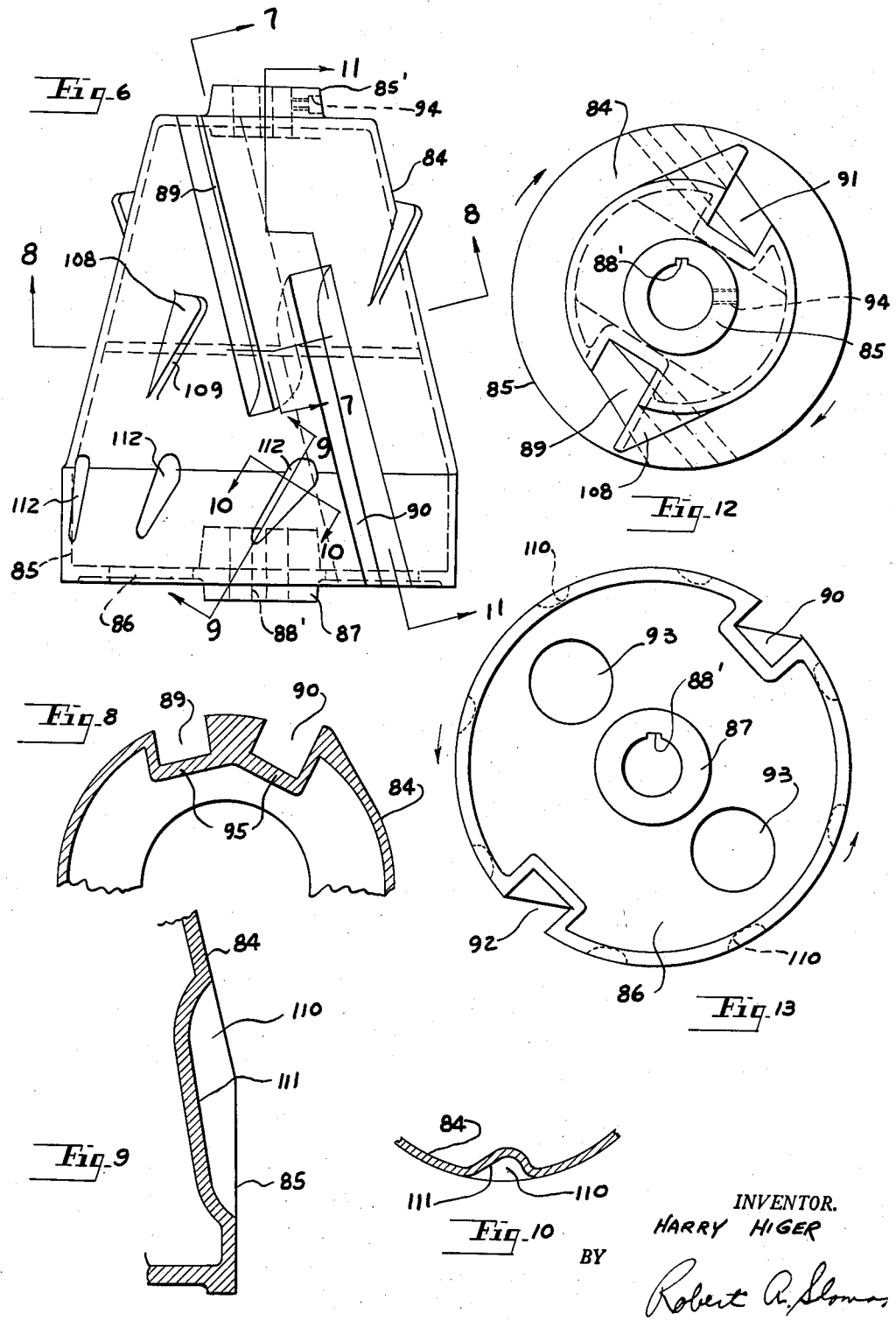

Aug. 5, 1958
H. HIGER
2,846,155
REFUSE DISPOSAL APPARATUS
Filed April 1, 1954
4 Sheets-Sheet 4
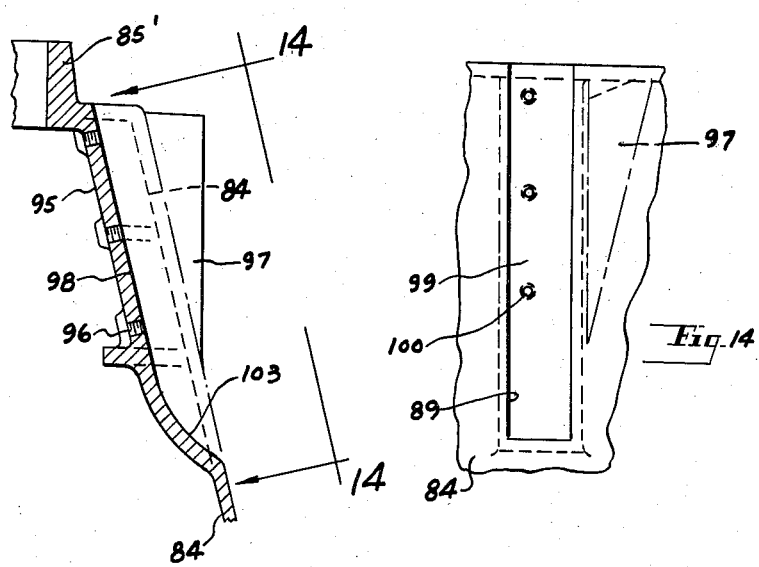
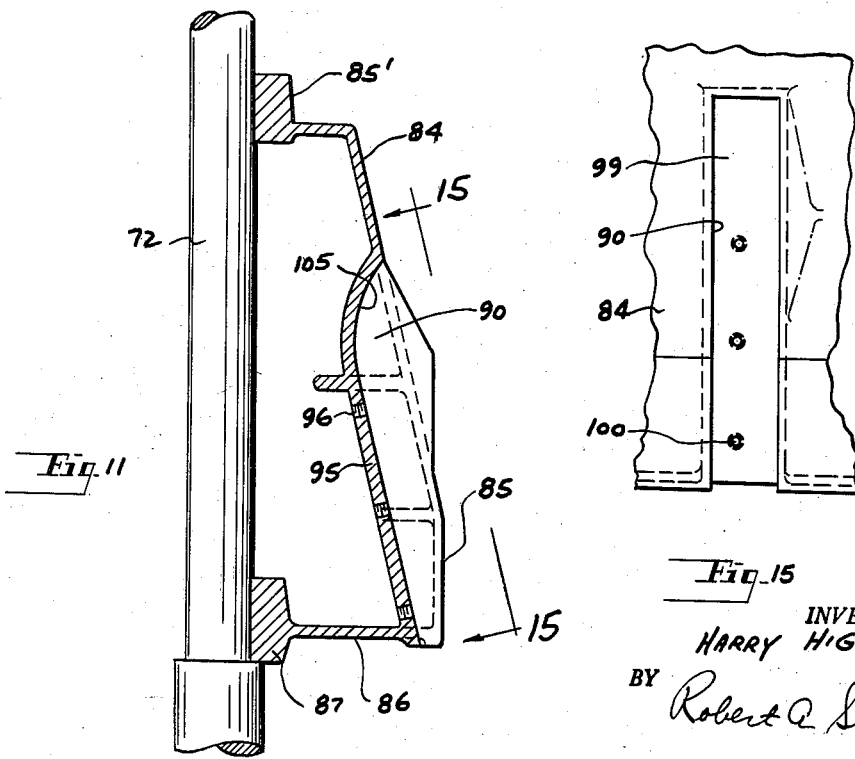
INVENTOR.
HARRY HIGER
BY Robert A. Sloman
ATTORNEY United States Patent Office 2,846,155
Patented Aug. 5, 1958

2,846,155

REFUSE DISPOSAL APPARATUS

Harry Higer, Detroit, Mich.

Application April 1, 1954, Serial No. 420,286

5 Claims. (Cl. 241—257)

This application is a continuation-in-part of my co-pending application, Serial No. 352,882, filed May 4, 1953, now abandoned.

This invention relates to a refuse disposal apparatus, and more particularly to a disposal apparatus for home or commercial use.

It is the object of the present invention to provide a novel and simplified refuse disposal apparatus, which consists of a chambered housing including a set of stationary yet adjustable blades and within said housing a power operated rotor carrying blades for shearing cooperation therewith.

It is the further object of the present invention to provide a novel structure for supporting and mounting the casing blades.

It is the further object of the present invention to provide a novel chamber arrangement within the apparatus, which is highly efficient in conjunction with the operation of the rotor within the casing.

It is the still further object of this invention to provide a novel rotor construction whereby the cut material may be recirculated many times in order to assure the fine cutting up thereof before it is washed down the drain.

These and other objects will be seen from the following specification and claims, in conjunction with the appended drawings, in which:

Fig. 2 is a fragmentary plan view thereof with the hopper omitted.

Fig. 3 is a section taken on line 3—3 of Fig. 1.

Fig. 4 is a section taken on line 4—4 of Fig. 1.

Fig. 5 is a fragmentary section taken on line 5—5 of Fig. 1.

Fig. 6 is a side elevational view of the rotor.

Fig. 7 is a section taken on line 7—7 of Fig. 6.

Fig. 8 is a fragmentary section taken on line 8—8 of Fig. 6.

Fig. 9 is a fragmentary section taken on line 9—9 of Fig. 6.

Fig. 10 is a transverse section taken on line 10—10 of Fig. 6.

Fig. 11 is a fragmentary section taken on line 11—11 of Fig. 6.

Fig. 12 is a plan view of Fig. 6.

Fig. 13 is a bottom plan view thereof.

Fig. 14 is a fragmentary section taken on line 14—14 of Fig. 7; and

Fig. 15 is a fragmentary section taken on line 15—15 of Fig. 11.

Figure 1:
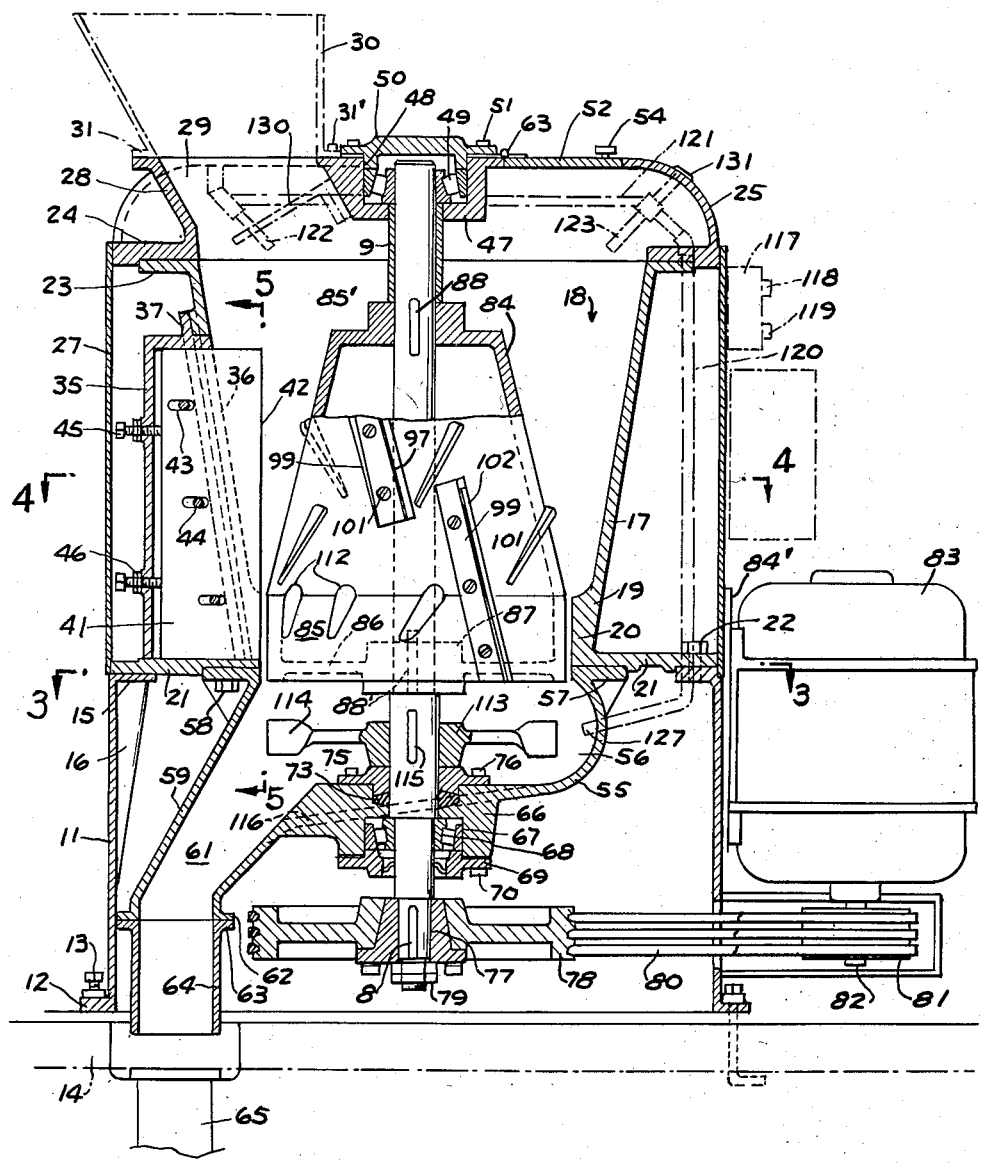
Fig. 1 is an elevational view of the present disposal apparatus.

It will be understood that the above drawings illustrate merely one preferred embodiment of the invention and that other embodiments are contemplated within the scope of the claims hereafter set forth.

Referring to the drawings, the present refuse disposal apparatus comprises a hollow upright casing which includes the upright cylindrical shell 11 with outturned flanges 12 at its lower end adapted for securing to a suitable base 14 by the fastening bolts 13. Said shell has an annular inwardly directed flange 15 upon which is supported the main circular flange 21 at the lower end of main casing 17, there being a series of reinforcing ribs 16 forming a part of shell 11 for strengthening the same.

In the preferred embodiment of the invention, casing 17 is of conical shape of decreasing internal diameter defining therein the receiving chamber 18.

At the lower end of the converging portion of said casing, there is provided an upright cylindrical portion 19 which thereby defines a delivery chamber 20, which communicates with the lower end of said receiving chamber. The circular plate 21 which forms a part of said casing at its lower end resting upon shell flange 15 and is secured thereto by a series of bolts 22.

At the upper end of casing 17 there is provided an outwardly directed annular flange 23, upon which is mounted and suitably secured the cover 25 for said casing. Said cover includes a series of outwardly projecting flanges 24 which are adapted to rest upon casing flange 23 and are secured thereto by the bolts or screws 26.

There is provided upon the outside of casing 17 a cylindrical shell 27 which encloses the same and which is substantially in longitudinal alignment with shell 11.

Cover 25 has a wall formation 28 formed in one side thereof, which defines, with the depressed cover boss 47, the inlet passageway 29 providing communication into receiving chamber 18.

There is mounted upon the top of cover 25 a suitably formed hopper 30 whose lower out-turned flanges 31 provide a means of securing the same to said cover as by the bolts 31'.

As shown in Fig. 4, the casing 17 has a series of reinforcing ribs 17'. Intermediate said ribs there are provided around said casing a plurality of outwardly projecting bosses 32 having flat surfaces upon which are mounted blade holders 35.

There are provided through said casing a series of spaced radial slots which extend, respectively, in the general planes passing through the axis of the apparatus throughout a substantial portion of the length of said casing 17 and throughout the cylindrical portion 19 thereof, and into which is projected the elongated portion 34 of blade holder 35.

Said blade holders are secured to the casing bosses with the aid of bolts 39. As shown in Fig. 1, each of the blade holders 35 has an upwardly projecting flange 37 which bears upon the outside surface of casing 17 for limiting the inward movement of said holders with respect to the casing. Furthermore, said holders have the oppositely arranged side flanges 38 by which said blade holders may be bolted to the exterior of said casing as at 39.

As shown in dotted lines in Fig. 1, the forward portion of said blade holder is downwardly and inwardly tapered as at 36 corresponding to the interior surfaces of chambers 18 and 20.

Said blade holders each have an upright elongated slot 40 within which is adjustably positioned the upright rectangularly shaped stationary casing blades 41 with sharpened inner leading edges 42.

There are provided within each of the blades a series of vertically spaced horizontally extending parallel slots 43 receiving the transverse guide pins 44, or equivalent guide means, which extend through blade holders 35.

There are provided upon each of said blade holders in vertically spaced relation a pair of horizontally disposed threaded openings in alignment with the outer upright edge of blade 41 adapted to threadedly receive bolts 45, the inner ends of which operatively engage blade 41, there being suitable lock nuts 46 provided for securing the bolts 45 in the desired position of adjustment.

As the bolts 45 engage blades 41, radial adjustments thereof may be effected. Such adjustments may be desired, for instance, from time to time as the cutting edges 42 of the blades wear or become dull and have to be reground.

The boss 47 within the central portion of cover 25 has a recess 48 adapted to receive the bearings 49 which are held within said recess by the bearing cap 50 secured to said boss as by the bolts 51.

There is provided also upon said cover a convenient trap door 52 hinged thereto at 63 and having a suitable handle 54.

Directly below the main casing 17 and below the delivery chamber 20 there is provided a formed casing 55, which thereby defines an outlet chamber 56 into which the cut refuse will be washed in the manner hereafter described. Said casing has at its upper end the outwardly directed annular flange 57, whereby said casing is secured to the underside of the casing plate 21, as by the bolts 58.

The outlet chamber 56 upon one side terminates in the outlet passageway 61, which is formed by the downwardly and outwardly inclined wall elements 59 and 60, which terminate in the annular flange 62 at their lower ends. Said flanges are in registry with a corresponding flange 63 at the upper end of drain pipe 64 which is adapted for communication with the sewer drain pipe 65 of Fig. 1.

Said casing 55 defining outlet chamber 56 has a central boss 66 formed therein and which has an internal cavity 67 for housing the tapered thrust bearings 68, there being a bearing cap 69 cooperable with said bearings for securing the same within said cavity as by the bolts 70.

The upright rotatable elongated shaft 72 extends through the lower bearing 68 and has a shoulder 72' of slightly increased diameter which rests upon a portion of said bearings whereby said shaft is journaled and supported at its lower end upon said casing 55. The upper end of said shaft extends through the sleeve 9 and through the bearings 49 carried by cover 25, there being a suitable seal 71 surrounding said shaft and positioned within bearing plate 69, as shown in Fig. 1. Above said bearing and within a recess in the top surface of boss 66 there is provided a suitable packing gland 73, which is held down by plate 75 bolted to said boss as at 76.

Upon the lower end of shaft 72 there is bolted as at 79, the tapered hub 77 over which is secured the pulley 78 and which is suitably keyed to shaft 72 as at 8.

An electric motor 83 secured to the outside of the shell elements 11 and 27 as indicated at 84' is provided for the purpose of driving the apparatus. Driving connection between the shaft 82 of said motor and the shaft 72 is effected with the aid of a belt-and-pulley drive including driving pulley 81 connected with the driven pulley 8 of the shaft 2 with the aid of a plurality of belts 80. The motor 83 is controlled with the aid of a switch 117, including on-and-off push buttons 118 and 119.

There is provided within casing 17, including its cylindrical portion 20 the power driven rotor 84 which is preferably of conical shape in the preferred embodiment herein. Said rotor is downwardly and outwardly tapered throughout the upper portion thereof corresponding to the interior of receiving chamber 18, and this tapered portion terminates in the cylindrical portion 85 which is positioned within delivery chamber 20 and which thereby defines the upright annular passageway which communicates with the lower end portion of receiving chamber 18 and through which the cut up material must pass. There is thus provided an elongated restricted passageway through which cut up material passes for movement in the manner hereafter described.

There is provided a bottom plate 86 at the lower end of rotor 84 which is transversely apertured as at 93, Fig. 13 and which includes the central hub 87, which is apertured to receive power shaft 72, and which is keyed thereto as at 88'. The upper end of rotor 84 also terminates in the upright centrally apertured boss 85' through which extends the upper portion of shaft 72, also keyed thereto as at 88' whereby said rotor moves in unison with said shaft and is thus a power driven rotor, suitably journaled and supported within bearings 49 and 68.

There are provided within said rotor a series of spaced blade receiving slots 89, 90, 91 and 92, upon opposite sides thereof, whose longitudinal axes lie in planes at an acute angle to a plane passing through the longitudinal axis of said rotor.

As shown in the preferred embodiment of the invention, the said slots are arranged in pairs, such as the slots 89 and 90 and the two slots 91 and 92. And it will be noted that in each of said pairs of slots, the inner ends of said slots are longitudinally overlapped, whereas the outer ends thereof terminate in the top and bottom of said rotor.

There are provided right angularly arranged threaded openings 94 within boss 85' adapted to receive set screws for operative engagement with shaft 72, there also being the cylindrical hold-down spacer 9 upon said shaft between boss 85' and bearings 49. Furthermore boss 85' has an interior keyway 88', Fig. 12, for receiving the key 88.

Referring to Fig. 8, one pair of slots such as the slots 89 and 90, upon one side of rotor 84, have base portions 95 and the intermediate enlarged portion therebetween.

Fig. 7 is a fragmentary section taken on line 7—7 of Fig. 6 to indicate the structure and formation of the slotted portion of said rotor into which rotor blade 97 is positioned and secured. Said blade has a tapered elongated edge 98, which registers with slot wall 95, said wall having a series of vertically aligned threaded recesses 96 formed therein. Rotor blade 97 is positioned within slot 89 and is secured therein by the hold-down plate 99 which wedgingly engages plate 97 and is secured within the said slot 89 by a series of bolts 101, which extend through openings 100 in plate 99 and through the threaded openings 96 at the base of slot 89.

Similarly, there is provided a second inclined blade 102, which is positioned within elongated slot 90 and similarly secured therein by blade hold-down plate 99 and the bolts 101, as illustrated in Fig. 1.

Referring to Fig. 7, the slot 89 at its lower end is tapered outwardly as at 103 and merges at its lower end with the outer wall of rotor 84.

Referring to Fig. 11, there is also illustrated the cross-sectional shape of rotor receiving slot 90, which is also bounded by the bottom wall 95 with threaded openings 96 therein, by which blade 102 may be anchored in position through the functioning of anchor plate 99. In the case of slot 90, the same is tapered outwardly at its upper end as at 105 and merges with the outer wall 84 of the rotor structure as shown.

Thus, there is seen from Fig. 6, that the slots 89 and 90 overlap each other and are laterally spaced with respect to each other. As indicated, the outer edges of the rotor blades lie in an upright plane closely adjacent an upright plane passing through the adjacent casing blade.

There are provided upon the exterior of said rotor, a series of outwardly projecting vanes 108, which are vertically spaced and of triangular longitudinal shape and which are of greatest lateral height at their upper ends. Each of the pairs of spaced vanes 108 are arranged at an acute angle to the adjacent rotor blade and are employed for a purpose hereafter described. Said vanes are upwardly and outwardly tapered as at 109.

Formed within the lower portion of said rotor and mainly within its cylindrical portion 85 are a series of circularly spaced elongated recesses 112.

Here also these recesses are inclined at an acute angle to a corresponding rotor blade.

Fig. 9 is a fragmentary section through a portion of the rotor to indicate the longitudinal shape of recess 112 and illustrates the depressed elongated bottom wall 111.

Fig. 10 is a transverse section through a portion of the rotor illustrating the concave formation 111 which defines transversely the said recesses 112.

The series of spaced recesses 112 cooperate with vanes 108 and in the operation of the present device are adapted to effect an upward recirculation many times of the material as it is cut up between the stationary and rotating blades, to thereby assure that said material is cut up many times into finely divided particles after which the material is washed down through delivery chamber 20 and into outlet chamber 56.

Mounted adjacent the lower end of shaft 72 there is secured thereto as by the key 115, the hub 113 of the oppositely arranged impeller blades 114 which are adapted to rotate within outlet chamber 56 and are adapted to facilitate the downward and upward movement of the cut up material in solution through the delivery passage 61.

As shown in dotted lines in Fig. 1, the bottom of casing 55 is defined at 116 as being downwardly tapered toward the outlet passage 61 for guiding the material thereinto.

There is provided upon the casing of the present disposal apparatus and within the shell elements 11 and 27 thereof, an upright water supply pipe 120 having a circularly arranged branch 121 at its upper end from which extend a series of spaced angularly arranged water outlets 122, 123 and 124, and which are positioned within the upper end of receiving chamber 18 for washing the material downwardly therein and therethrough.

The lower end of water pipe 120 terminates in the semi-circularly shaped pipe element 125—126 with outlets 127 and 128, which angularly project into opposite sides of outlet chamber 56 and are employed for the purpose of facilitating in the flushing of the cut up material into the delivery passage 61.

There is also shown in dotted lines as at 129, the converging wall formation of casing 55, whereby the cut up material is guided towards the delivery passage 61, as indicated in Fig. 3.

While the drawings illustrate hopper 30 upon the top of cover 25, it is contemplated that said hopper could be positioned upon the side of the casing or cover, as desired.

As shown in Fig. 1, there is provided within inlet passage 29 at the upper end of the casing a flexible, preferably rubber or equivalent gate 130 which extends partially across said inlet passage for the purpose of preventing back splashing of fluids.

Having described my invention, reference should now be had to the claims which follow for determining the scope thereof.

I claim:

1. In a refuse disposal apparatus, a casing including a converging receiving chamber, an inlet passageway connected to the upper end thereof, a delivery chamber depending from the lower end of said receiving chamber, an outlet chamber communicating with the lower end of said delivery chamber, and an outlet passage of reduced dimension depending from said outlet chamber, said casing having a series of upright spaced slots formed therethrough communicating with said receiving and delivery chambers, upright radially adjustable blades secured to said casing in said slots and projecting into said receiving and delivery chambers, a rotatable rotor journaled and supported within said casing within said receiving and delivery chambers, angularly inclined spaced blades secured blades secured to said rotor and having outer cutting blades adapted to meet in successive and progressive shearing engagement with the edges of said casing blades substantially through the entire length thereof, said receiving chamber being of annular shape with downwardly directed angular cross section, said delivery chamber being cylindrically shaped, with said rotor being of upwardly directed conical shape within said receiving chamber and cylindrically shaped within said delivery chamber.

2. The apparatus defined in claim 1 and including spaced upright blade supports upon the outside of said casing and secured thereto and with a portion of said supports projected into said casing slots, said supports having upright blade-receiving slots, there being horizontal slots formed through said casing blades, and guide means for said blades cooperating with said slots.

3. The apparatus defined in claim 1 and including a plurality of spaced vanes projecting outwardly from said rotor toward the casing blades but terminating short of reaching the same, said vanes being inclined with respect to the axis of the rotor at such an angle as to produce in operation an upwardly directed force acting on the pieces of the matter within the receiving chamber.

4. In a refuse disposal apparatus, a casing including a converging receiving chamber, an inlet passageway connected to the upper end thereof, a delivery chamber depending from the lower end of said receiving chamber, an outlet chamber communicating with the lower end of said delivery chamber and an outlet passage of reduced dimension depending from said outlet chamber, said casing having a series of upright spaced slots formed therethrough communicating with said receiving and delivery chambers, upright radially adjustable blades secured to said casing in said slots and projecting into said receiving and delivery chambers, a rotatable rotor journaled and supported within said casing within said receiving and delivery chambers, angularly inclined spaced blades secured to said rotor and having outer cutting blades adapted to meet in successive and progressive shearing engagement with the edges of said casing blades substantially through the entire length thereof, said rotor having formed therein adjacent its lower end a series of elongated concave slots inclined at an acute angle to said rotor blades.

5. In a refuse disposal apparatus, a casing including a converging receiving chamber, an inlet passageway connected to the upper end thereof, a delivery chamber depending from the lower end of said receiving chamber, an outlet chamber communicating with the lower end of said delivery chamber and an outlet passage of reduced dimension depending from said outlet chamber, said casing having a series of upright spaced slots formed therethrough communicating with said receiving and delivery chambers, upright radially adjustable blades secured to said casing in said slots and projecting into said receiving and delivery chambers, a rotatable rotor journaled and supported within said casing within said receiving and delivery chambers, angularly inclined spaced blades secured to said rotor and having outer cutting blades adapted to meet in successive and progressive shearing engagement with the edges of said casing blades substantially through the entire length thereof, and a plurality of spaced vanes projecting outwardly from said rotor and inclined at an acute angle to an adjacent rotor blade, said rotor having formed therein adjacent its lower end a series of elongated concave slots inclined at an acute angle to said rotor blades.

References Cited in the file of this patent

UNITED STATES PATENTS

| | | |
|---|---|---|
| 1,174,656 | Beckwith | Mar. 7, 1916 |
| 1,691,983 | Miller | Nov. 20, 1928 |
| 1,975,389 | Cox et al. | Oct. 2, 1934 |
| 2,216,612 | Dimm et al. | Oct. 1, 1940 |
| 2,220,729 | Powers | Nov. 5, 1940 |
| 2,442,812 | Jordan | June 8, 1948 |
| 2,669,240 | Thorson | Feb. 16, 1954 |

FOREIGN PATENTS

| | | |
|---|---|---|
| 849,600 | Germany | Sept. 15, 1952 |